United States Patent
Chiu

Patent Number: 5,829,494
Date of Patent: Nov. 3, 1998

[54] FILLING TUBE ASSEMBLY FOR AN OIL TANK

[76] Inventor: Chun Ta Chiu, 8F-2, No. 185, Fu Kuo Road, Kaohsiung, Taiwan, Taiwan

[21] Appl. No.: 896,160

[22] Filed: Jul. 17, 1997

[51] Int. Cl.$^6$ .................................. B65B 1/04; B65B 3/04
[52] U.S. Cl. .................. 141/312; 141/384; 220/86.2; 222/539
[58] Field of Search ........................... 141/312, 337–339, 141/367, 374, 379, 384, 383; 220/86.2, 212, 375; 222/539

[56] References Cited

U.S. PATENT DOCUMENTS

| 579,626 | 3/1897 | Wilson | 222/539 |
|---|---|---|---|
| 4,548,344 | 10/1985 | Hestehave et al. | 222/539 |
| 5,033,521 | 7/1991 | Martin | 141/339 |

*Primary Examiner*—Steven O. Douglas
*Attorney, Agent, or Firm*—Pro-Techtor InterNational Services

[57] ABSTRACT

A filling tube assembly adapted for fastening to a threaded filling hole of an oil tank for filling fuel oil, including a connector and a filling tube having a first end fixedly connected to the connector and a second end remote from the connector, wherein the connector has a first outer thread at one end, a second outer thread at an opposite end, and a collar raised around the periphery between the first outer thread and the second outer thread, the first outer thread and the second outer thread being adapted for threading into the threaded filling hole of the oil tank or screwing up with a screw cap alternatively, the filling tube being suspended inside the oil tank and the passage of the oil tank being closed when the second outer thread is threaded into the threaded filling hole of the oil tank and the first outer thread is screwed up with the screw cap, the filling tube being extended out of the oil tank for filling fuel oil into the oil tank when the first outer thread is threaded into the threaded filling hole of the oil tank and the screw cap is removed from the connector.

3 Claims, 7 Drawing Sheets

5,829,494

1

FILLING TUBE ASSEMBLY FOR AN OIL TANK

BACKGROUND OF THE INVENTION

The present invention relates to a filling tube assembly for use in an oil tank for filling fuel oil, and more particularly to such a filling tube assembly which can be alternatively arranged in the non-operative condition received inside the oil tank, and the operative position extended out of the oil tank.

FIG. 1 shows a regular oil tank (10) of a motor vehicle for example a military jeep. Referring to FIG. 2 and FIG. 1 again, the oil tank (10) comprise a filling hole (101) having an inner thread (102), and a screw cap (20) having an outer thread (201) adapted for threading into the inner thread (102) to seal the filling hole (101). When the screw cap (20) is removed from the oil tank (10), a filling tube assembly shall be used and installed in the filling hole (101) so that fuel oil can be conveniently filled into the oil tank (10). The filling tube assembly, as shown in FIG. 3, comprises a connector (40), a filling tube (30) having one end fixedly connected to the connector (40) and an opposite end detachably covered with a cap (301). As illustrated in FIG. 4, the connector (40) has an outward flange (403) raised around the periphery of its top end and stopped at the outside wall of the oil tank (10), an outer thread (402) threaded into the inner thread (102) of the oil tank (10), and a rubber seal ring (50) mounted around the outer thread (402) and retained between the outside wall of the oil tank (10) and the outward flange (403). When the filling tube assembly is must be disconnected from the oil tank (10) so that the filling hole (101) can be sealed with the screw cap (20). If the filling tube assembly is not properly received after its removal from the oil tank (10), the user may forget the location of the filling tube assembly when the oil tank (10) is empty and needs to be filled up with fuel oil again. Furthermore, the connecting area between the filling tube (20) and the connector (40) wears quickly with use, causing a leakage to occur.

SUMMARY OF THE INVENTION

The present invention has been accomplished to provide a filling tube assembly for an oil tank which eliminates the aforesaid drawbacks. It is one object of the present invention to provide a filling tube assembly for an oil tank which can be firmly secured to the inside of the oil tank when it is not in use. It is another object of the present invention to provide a filling tube assembly for an oil tank which prevents an oil leakage. According to one aspect of the present invention, the filling tube assembly is comprised of a connector, and a filling tube having one end fixedly connected to the connector. The connector has a first outer thread at one end, a second outer thread at an opposite end, and a collar raised around the periphery between the first outer thread and the second outer thread. The first outer thread and the second outer thread are adapted for threading into the threaded filling hole of the oil tank or screwing up with a screw cap alternatively. The filling tube is suspended inside the oil tank and the passage of the oil tank is closed when the second outer thread is threaded into the threaded filling hole of the oil tank and the first outer thread is screwed up with the screw cap. The filling tube is extended out of the oil tank for filling fuel oil into the oil tank when the first outer thread is threaded into the threaded filling hole of the oil tank and the screw cap is removed from the connector. According to another aspect of the present invention, the connector has an inside annular flange, and upright locating pins raised from the inside annular flange; the filling tube has an outward flange at one end supported on the inside annular flange of the connector, and a plurality of pin holes equiangularly spaced at the inside annular flange and respectively and fixedly fastened to the pin holes of the outward flange of the filling tube; a rubber seal ring is mounted around the filling tube and retained between the outward flange of the filling tube and the inside annular flange of the connector to seal the gap.

DETAILED DESCRIPTION OF THE PREFERRED EMBODIMENT

Figure 1:
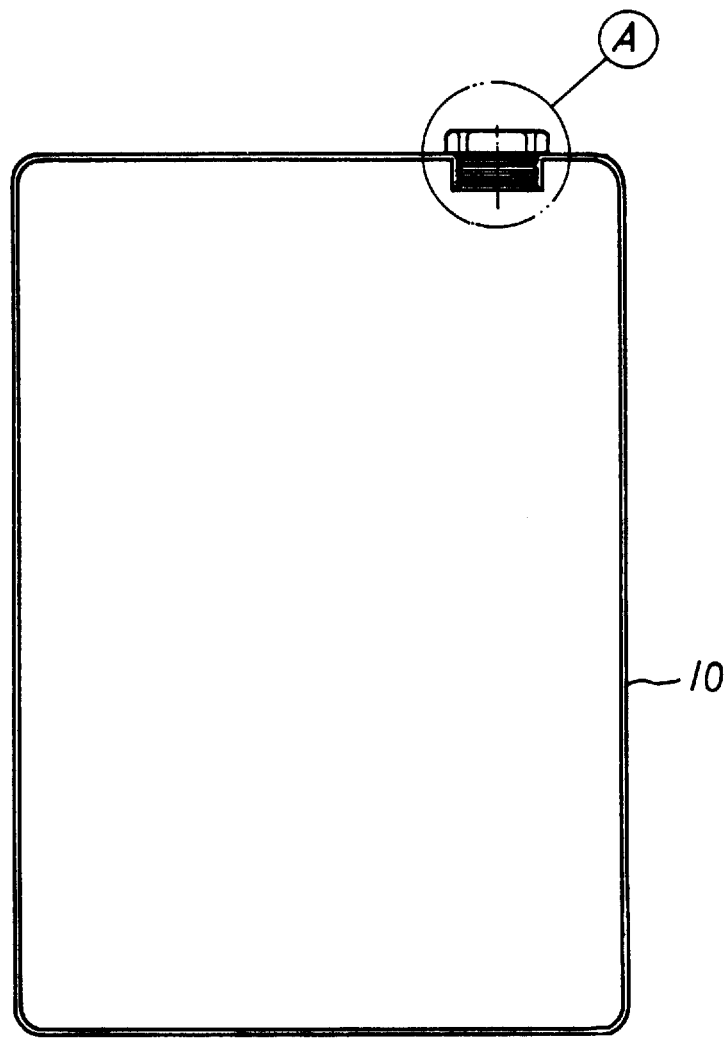
FIG. 1 is a sectional plain view of an oil tank according to the prior art.
Figures 2, 3:
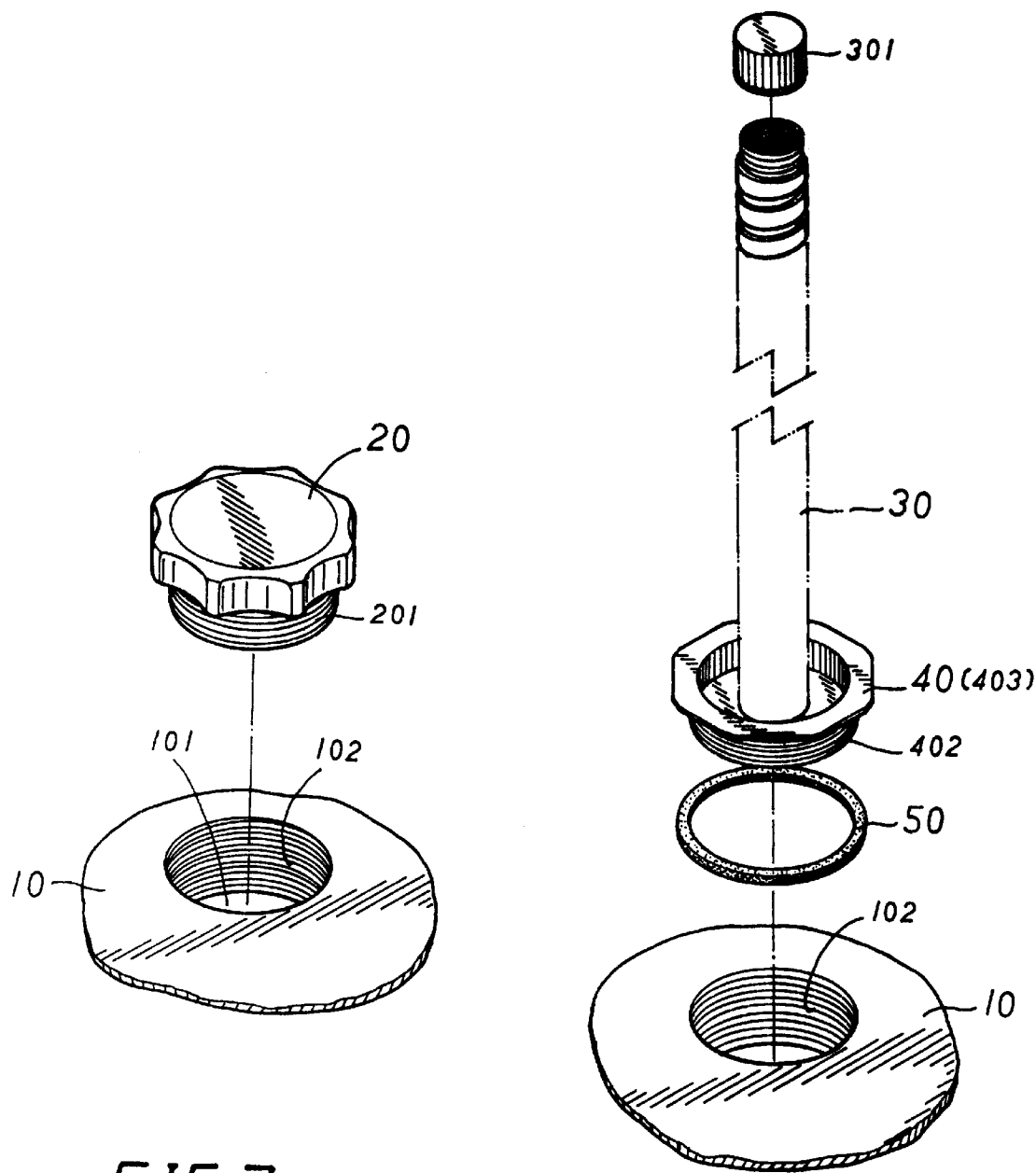
FIG. 2 is an exploded view of part A of FIG. 1.
FIG. 3 is an exploded view of a filling tube assembly according to the prior art.
Figure 4:
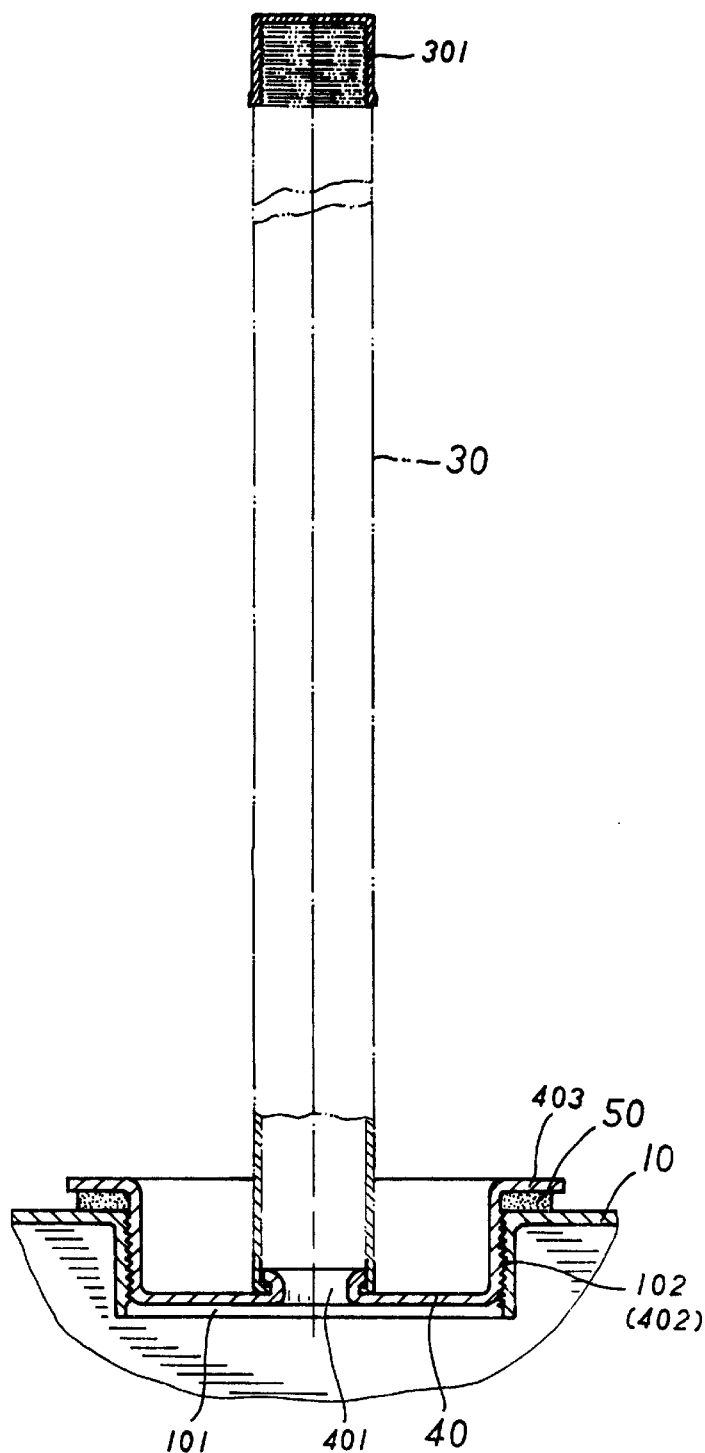
FIG. 4 is a sectional view in an enlarged scale showing the filling tube assembly of FIG. 3 installed.
Figure 5:
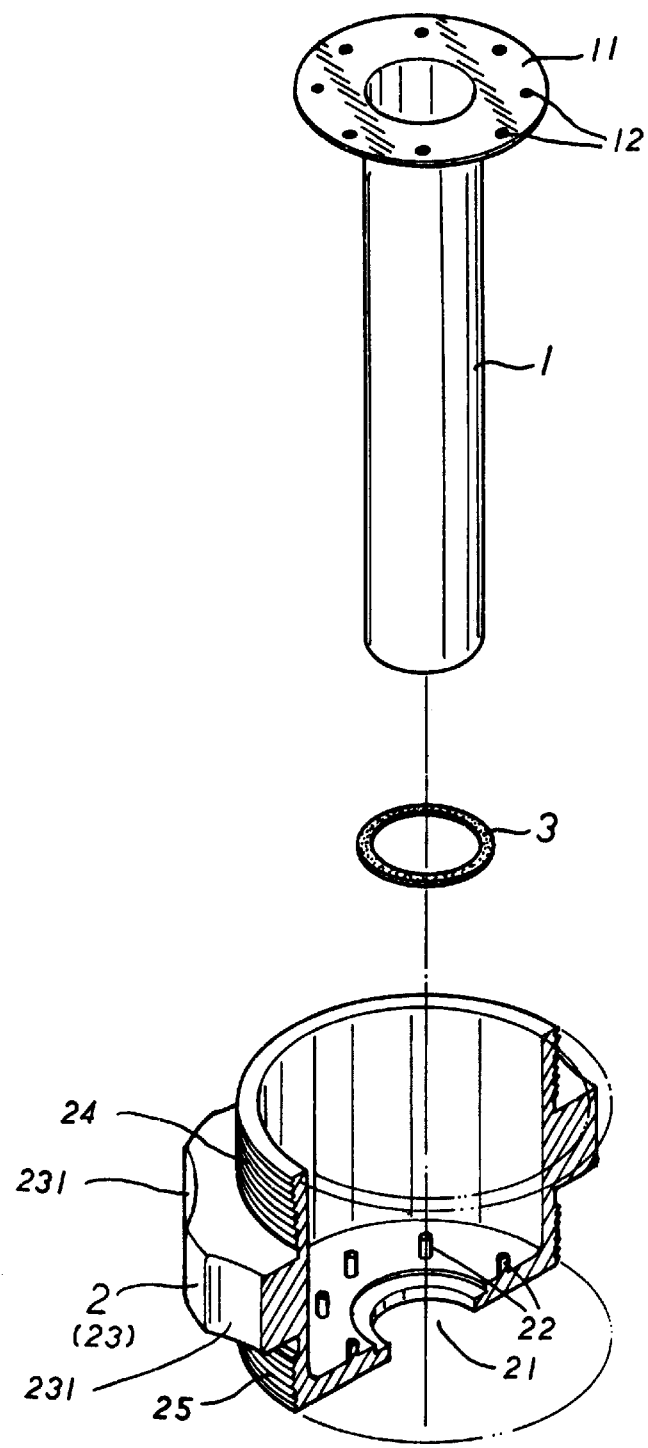
FIG. 5 is an exploded and partially sectional view of a part of a filling tube assembly according to the present invention.
Figure 6:
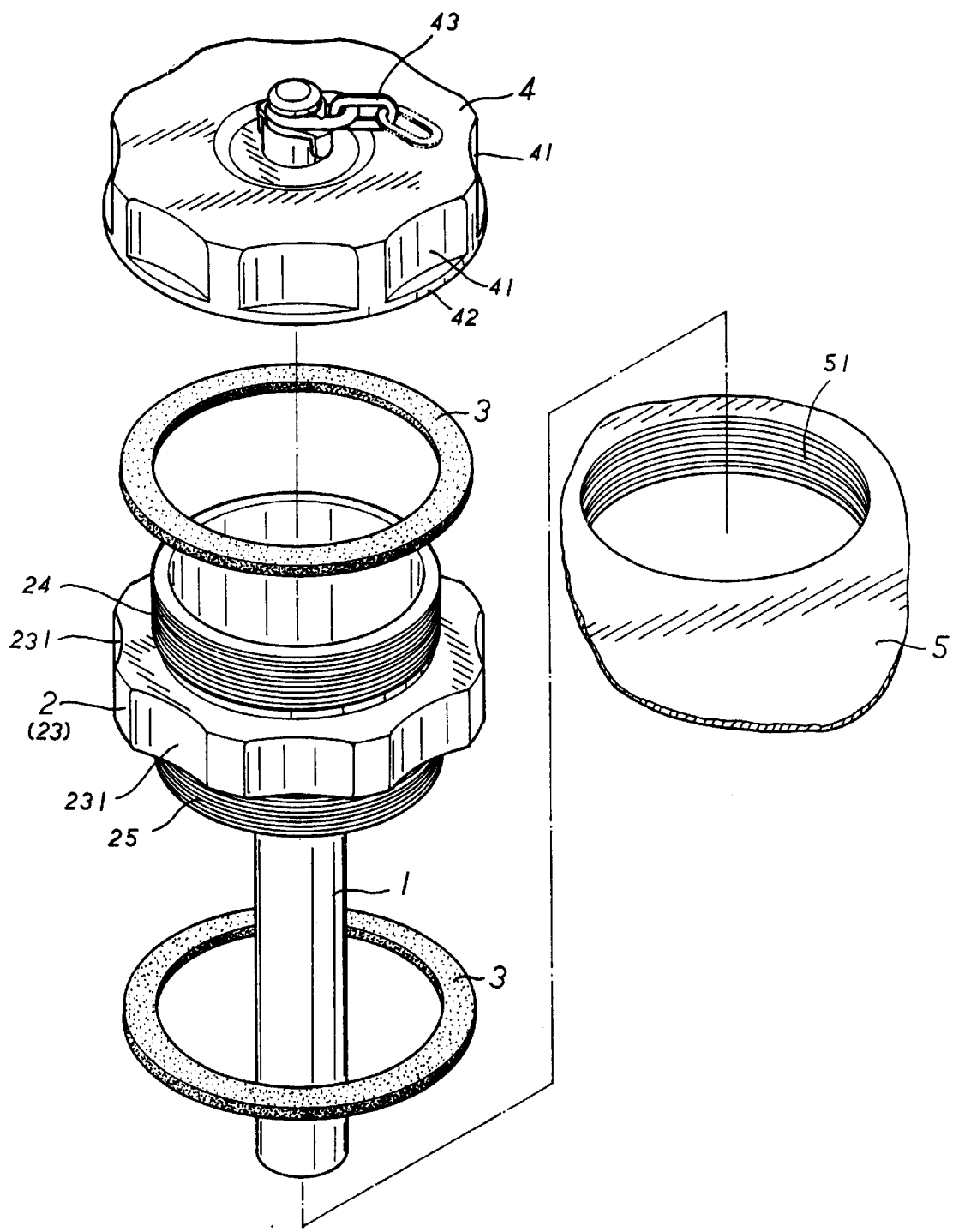
FIG. 6 is a perspective view of the present invention, showing the relationship between the threaded filling hole of the oil tank and the screw cap.

Referring to FIGS. from 5 and 6, a filling tube assembly in accordance with the present invention is generally comprised of a filling tube 1, and a cylindrical connector 2. The filling tube 1 comprises an outward flange 11 raised around its one end, and a plurality of pin holes 12 equiangularly spaced at the outward flange 11. The cylindrical connector 2 comprises a first outer thread 24 at one end, a second outer thread 25 at an opposite end adapted for threading into a threaded filling hole 51 of an oil tank 5, a collar 23 raised around the periphery in the middle between the first outer thread 24 and the second outer thread 25, an inside annular flange 21 raised from its inside wall at one end, and a plurality of upright locating pins 22 raised from the inside annular flange 21 at an inner side. The collar 23 has a plurality of finger grooves 231 equiangularly spaced around the periphery and axially extended through its height. A screw cap 4 is connected to the outside wall of the oil tank 5 by a chain 43. The screw cap 4 comprises a circular bottom flange 42 around the periphery, and a plurality of finger grooves 41 equiangularly spaced around the periphery and axially extended from the circular bottom flange 42. The filling tube 1 and the connector 2 are fastened together by: inserting filling tube 1 through the connector 2 and attaching the outward flange 11 of the filling tube 1 to the inside annular flange 21 of the connector 2, permitting the locating pins 22 of the connector 2 to be respectively fitted into the pin holes 12 of the outward flange 11 of the filling tube 1, then hammering down the ends of the locating pins 22 to fixedly secure the outward flange 11 of the filling tube 1 to the inside annular flange 21 of the connector 2.

Figure 7:
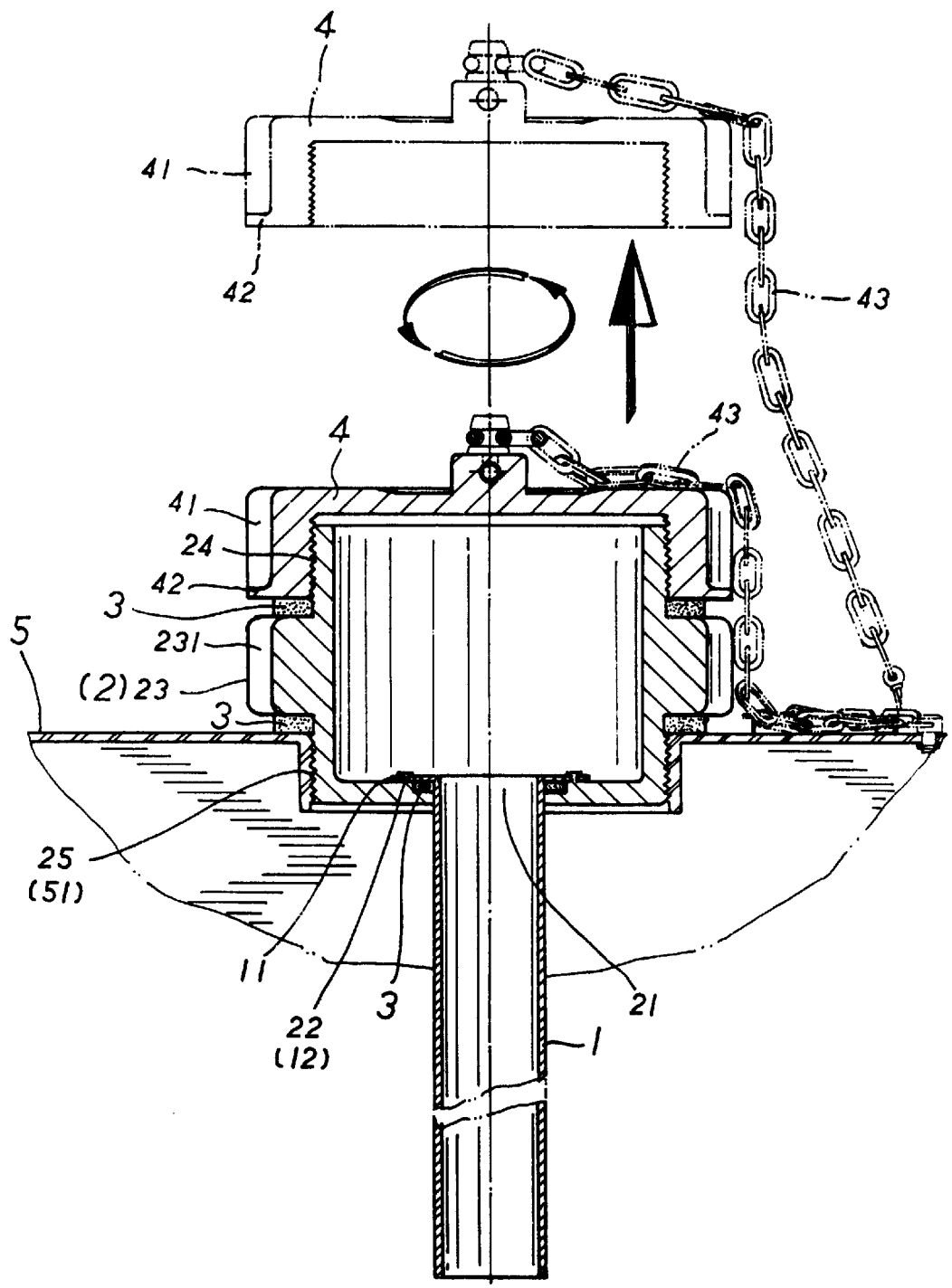
FIG. 7 is a sectional view of the present invention, showing the filling tube assembly installed in the oil tank and arranged in the non-operative position.
Figure 8:
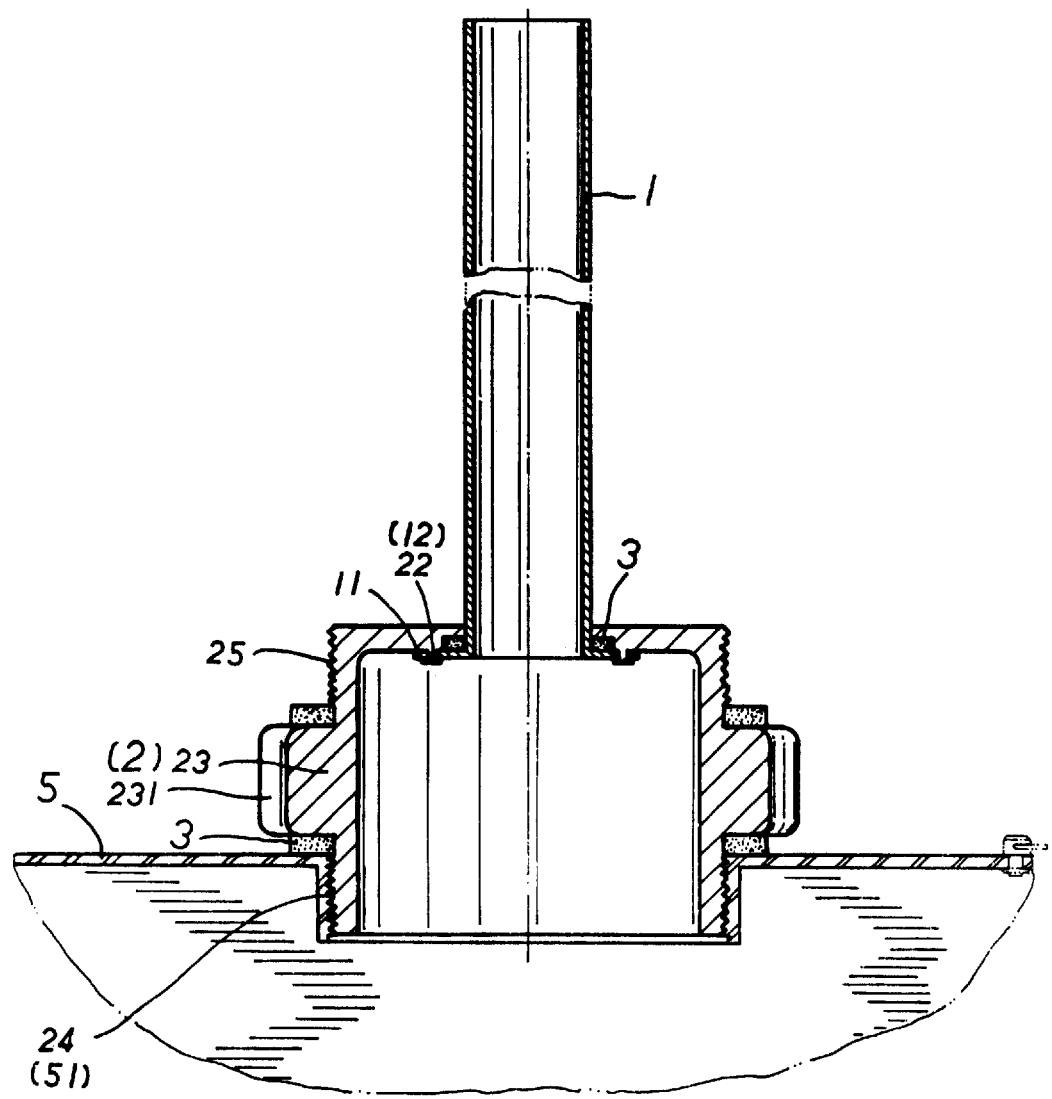
FIG. 8 is another sectional view of the present invention, showing the filling tube assembly installed in the oil tank and arranged in the operative position.

Referring to FIG. 7 and 8, and FIGS. 5 and 6 again, when the filling tube 1 is inserted into the threaded filling hole 51 of the oil tank 5, the second outer thread 25 of the connector 2 is threaded into the threaded filling hole 51, and then the screw cap 4 is threaded onto the first outer thread 24 of the connector 2 to seal the passage of the threaded filling hole 51, and therefore the filling tube assembly is arranged in the non-operative position (see FIG. 7); when the screw cap 4 is removed from the first outer thread 24 of the connector 2, the connector 2 is disconnected from the oil tank 5, and then the first outer thread 24 of the connector 2 is threaded into the threaded filling hole 51 of the oil tank 5, permitting the filling tube 1 to be extended outside the oil tank 5, and therefore the filling tube assembly is arranged in the operative position (see FIG. 8).

Furthermore, rubber seal rings 3 are respectively mounted around the first outer thread 24 and second outer thread 25 of the connector 2 and the filling tube 1 and respectively retained between the collar 23 and the screw cap 4, the collar 23 and the outside wall of the oil tank 5, the inside annular flange 21 of the connector 2 and the outward flange 11 of the filling tube 1 to seal the gaps.

While only one embodiment of the present invention has been shown and described, it will be understood that various modifications and changes could be made thereunto without departing from the spirit and scope of the invention disclosed.

What the invention claimed is:

1. A filling tube assembly adapted for fastening to a threaded filling hole of an oil tank for filling fuel oil, comprising:

a connector and a filling tube having a first end fixedly connected to said connector and a second end remote from said connector, wherein said connector comprises a first outer thread at one end, a second outer thread at an opposite end, and a collar raised around the periphery between said first outer thread and said second outer thread said first outer thread and said second outer thread being adapted for threading into the threaded filling hole of said oil tank or screwing up with a screw cap alternatively, said filling tube being suspended inside said oil tank and the passage of said oil tank being closed when said second outer thread is threaded into the threaded filling hole of said oil tank and said first outer thread is screwed up with said screw cap, said filling tube being extended out of said oil tank for filling fuel oil into the oil tank when said first outer thread is threaded into the threaded filling hole of said oil tank and said screw cap is removed from said connector, and said filling tube further comprises an outward flange raised around the periphery of its first end, and a plurality of pin holes equiangularly spaced at said outward flange; said connector comprises an inside annular flange raised from an inside wall thereof at one end and abutted against the outward flange of said filling tube, and a plurality of upright locating pins raised from said inside annular flange and respectively and fixedly fastened to the pin holes of said filling tube.

2. The filling tube assembly of claim 1 further comprising a rubber seal ring mounted around said filling hole and retained between the outward flange of said filling tube and the inside annular flange of said connector.

3. A filling tube assembly adapted for fastening to a threaded filling hole of an oil tank for filling fuel oil, comprising:

a connector and a filling tube having a first end fixedly connected to said connector and a second end remote from said connector, wherein said connector comprises a first outer thread at one end, a second outer thread at an opposite end, and a collar raised around the periphery between said first outer thread and said second outer thread said first outer thread and said second outer thread being adapted for threading into the threaded filling hole of said oil tank or screwing up with a screw cap alternatively, said filling tube being suspended inside said oil tank and the passage of said oil tank being closed when said second outer thread is threaded into the threaded filling hole of said oil tank and said first outer thread is screwed up with said screw cap, said filling tube being extended out of said oil tank for filling fuel oil into the oil tank when said first outer thread is threaded into the threaded filling hole of said oil tank and said screw cap is removed from said connector, and wherein the collar of said connector has a plurality of axial finger grooves equiangularly spaced around the periphery for the gripping of the fingers; said screw cap comprises a circular bottom flange raised around the periphery and adapted to close the finger grooves of said connector at one end, and a plurality of finger grooves equiangularly spaced around the periphery and axially extended from said circular bottom flange.

\* \* \* \* \*